(12) United States Patent
Branson et al.

(10) Patent No.: US 10,639,704 B2
(45) Date of Patent: *May 5, 2020

(54) SELF-ALIGNING SWAGING PUNCH AND METHOD FOR SWAGING

(71) Applicant: HONEYWELL FEDERAL MANUFACTURING & TECHNOLOGIES, LLC, Kansas City, MO (US)

(72) Inventors: Donald Conrad Branson, Kansas City, MO (US); Kevin Troyer, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/144,603

(22) Filed: Sep. 27, 2018

(65) Prior Publication Data

US 2019/0022740 A1 Jan. 24, 2019

Related U.S. Application Data

(62) Division of application No. 15/897,240, filed on Feb. 15, 2018, now Pat. No. 10,112,234, which is a (Continued)

(51) Int. Cl.
*B21K 25/00* (2006.01)
*B23P 11/00* (2006.01)
(Continued)

(52) U.S. Cl.
CPC .............. *B21K 25/00* (2013.01); *B21D 28/34* (2013.01); *B21D 39/06* (2013.01); *B23P 11/00* (2013.01); *B21J 15/02* (2013.01); *B21J 15/10* (2013.01); *B21J 15/105* (2013.01); *B21J 15/36* (2013.01); *B26F 1/14* (2013.01); *Y10T 29/49908* (2015.01);
(Continued)

(58) Field of Classification Search
CPC ........ Y10T 29/49917; Y10T 29/49913; Y10T 29/49908; Y10T 29/49945; Y10T 29/49936; Y10T 29/49934; Y10T 29/49925; Y10T 29/49943; B21J 15/02; B21J 15/105; B21J 15/10; B21J 15/36;
(Continued)

(56) References Cited

U.S. PATENT DOCUMENTS 10,112,234 B2 * 10/2018 Branson ................. B21D 28/34

* cited by examiner

*Primary Examiner* — Jermie E Cozart
(74) *Attorney, Agent, or Firm* — Hovey Williams LLP

(57) ABSTRACT

A self-aligning swaging punch is provided for adjoining together a pin and a workpiece having a pinhole. The swaging punch comprises a shaft and a tip having an open-ended cavity. The shaft transfers an axial force from a press or hammer to the tip. The tip transfers the axial force from the shaft to a top surface of the workpiece near the pinhole. The tip may be spherical in shape for evenly deforming the workpiece near the upper edge of the pinhole. The open-ended cavity receives the pin therein and allows the pin to extend at least partially into the open-ended cavity while the tip contacts the workpiece. The open-ended cavity also ensures that the swaging punch is aligned with the pinhole and perpendicular to the surface of the workpiece when the pin is inserted into the pinhole such that the workpiece evenly deforms and presses against the pin.

20 Claims, 3 Drawing Sheets

Related U.S. Application Data division of application No. 14/862,990, filed on Sep. 23, 2015, now Pat. No. 10,040,113.

(51) Int. Cl.
*B21D 39/06* (2006.01)
*B21D 28/34* (2006.01)
*B21J 15/10* (2006.01)
*B21J 15/02* (2006.01)
*B21J 15/36* (2006.01)
*B26F 1/14* (2006.01)

(52) U.S. Cl.
CPC .... *Y10T 29/49913* (2015.01); *Y10T 29/49917* (2015.01); *Y10T 29/49925* (2015.01); *Y10T 29/49934* (2015.01); *Y10T 29/49936* (2015.01); *Y10T 29/49945* (2015.01)

(58) Field of Classification Search
CPC ......... B23P 11/00; B21D 39/06; B21D 28/34; B26F 1/14; B21K 25/00
See application file for complete search history.

SELF-ALIGNING SWAGING PUNCH AND METHOD FOR SWAGING

RELATED APPLICATIONS

This patent application is a divisional, and claims priority benefit with regard to all common subject matter, of earlier-filed U.S. patent application Ser. No. 15/897,240, filed on Feb. 15, 2018, and entitled "SELF-ALIGNING SWAGING PUNCH AND METHOD FOR SWAGING". Application Ser. No. 15/897,240 is a divisional of earlier-filed U.S. patent application Ser. No. 14/862,990, filed on Sep. 23, 2015, and entitled "SELF-ALIGNING SWAGING PUNCH AND METHOD FOR SWAGING". The identified earlier-filed patent applications are hereby incorporated by reference in their entireties into the present application.

STATEMENT REGARDING FEDERALLY-SPONSORED RESEARCH OR DEVELOPMENT

This invention was made with Government support under Contract No.: DE-NA0002839 awarded by the United States Department of Energy/National Nuclear Security Administration. The Government has certain rights in the invention.

BACKGROUND

Swaging is often used for affixing a pin or similar member to a workpiece. For example, swaging is often used to affix high-density radiopaque pins to workpiece subassemblies for identifying the location of the workpiece subassemblies in assembled units via radiography. Swaging is also often used during assembly procedures for temporarily affixing adjoining members. Swaging is conventionally performed by using a hand-held hammer to impact a sharp-tipped swaging punch that in turn plastically deforms material of a workpiece near the pin. The punch is repositioned and impacted at other points around the pin until the workpiece is sufficiently deformed. The deformed workpiece imparts a permanent compressive force on the pin or other member. However, this technique often yields inconsistent results due to inaccurate and random swaging punch placement and highly variable punch impact forces. Inaccurate swaging can damage the workpiece or ineffectively secure the pin to the workpiece.

SUMMARY

The present invention solves the above-described problems and provides a distinct advance in the art of swaging tools. More particularly, the present invention provides a self-aligning swaging punch that ensures an even swage around a workpiece and a repeatable swaging force applied to the workpiece.

An embodiment of the self-aligning swaging punch may be used for swaging a pin into a pinhole of a workpiece. The swaging punch broadly includes a shaft and an inwardly-tapered tip.

The shaft transfers axial force to the inwardly-tapered tip. The shaft may be substantially cylindrical or radially symmetrical and may be formed of tool-grade steel or other similar high-strength material.

The inwardly-tapered tip transfers the axial force from the shaft to a workpiece and may include an upwardly extending open-ended cavity. The tip may be spherical, frusto-conical, oblong, or any other suitable inwardly-tapered shape. Alternatively, the tip may have an orthogonal cross section. The tip may be an extension or an integral part of the shaft and may be formed of tool-grade steel or other similar high-strength material.

The open-ended cavity is formed in the distal end of the tip or shaft and receives at least a portion of a pin therein. The open-ended cavity may be cylindrical (circular cross section) or any other suitable shape for restricting sideways movement of the pin within the open-ended cavity. The open-ended cavity may have a diameter that is slightly larger than the diameter of the pin but slightly smaller than the diameter of the pinhole in the workpiece.

Use of the swaging punch will now be summarized. First, a pin may be inserted into the open-ended cavity. The swaging punch may then be positioned near a pinhole of a workpiece such that the pin is at least partially inserted into the pinhole. The tip of the swaging punch may contact the top surface of the workpiece near an edge of the workpiece extending around the top of the pinhole. The open-ended cavity will ensure that the swaging punch is aligned with the pin and is perpendicular to the top surface of the workpiece. A controlled coaxial force may then be applied to the shaft of the swaging punch such that the tip presses against the top surface of the workpiece near the edge. The contoured tip will deform the material of the workpiece near the edge such that some of the material deflects radially inwardly into the pinhole against the pin. This will create an interference fit between the pin and the workpiece. The workpiece will thus exert an inward force on the pin so as to retain the pin in the pinhole after the swaging punch is removed.

The above-described swaging punch provides several advantages over conventional swaging systems. The shape of the tip ensures that the material deforms evenly into the pinhole around the pin. The open-ended cavity aligns the swaging punch and the pin perpendicularly with the outer surface of the workpiece. This ensures that the coaxial force is evenly transferred to the outer surface of the workpiece near the edge of the pinhole. The swaging punch could be used with a punch press or similar device having a force gauge for swaging additional pins with the same amount of force.

Another embodiment of the self-aligning swaging punch includes a plug cavity and a center-finder plug. The center-finder plug may be a cylindrical plug or other similar free-moving member that may shift into and out of the plug cavity. For example, the center-finder plug and the plug cavity may have complementary square or rectangular cross sections or any other shape. The center-finder plug may extend into the pinhole when the open-ended cavity and the pinhole are aligned with each other. The material of the workpiece may be deformed so as to press against the center-finder plug instead of the pin, thus securing the pin in the pinhole.

The above-described swaging punch provides several advantages over conventional swaging systems. For example, the center-finder plug ensures that the swaging punch is aligned with the pinhole. The center-finder plug also allows the pin to be secured in the pinhole without any portion of the pin extending beyond the outer surface of the workpiece.

Yet another embodiment of the self-aligning swaging punch includes a plug cavity and center-finder plug that both narrow towards their distal ends. For example, the plug cavity may have a frusto-conical shape while the center-finder plug may have a conical shape. The conical or narrowing shape of the center-finder plug will allow the center-finder plug to gradually extend farther out from the plug cavity when the swaging punch moves into alignment with the pinhole. Similarly, the conical or narrowing shape of the center-finder plug will allow the edge of the workpiece to gradually urge the center-finder plug into the plug cavity when the swaging punch moves out of alignment with the pinhole. The center-finder plug will extend farthest from the plug cavity when the swaging punch is aligned with the pinhole.

The above-described swaging punch provides several advantages over conventional swaging systems. For example, the center-finder plug ensures that the swaging punch is aligned with the pinhole while allowing the swaging punch to be slid along the outer surface of the workpiece into alignment with the pinhole.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
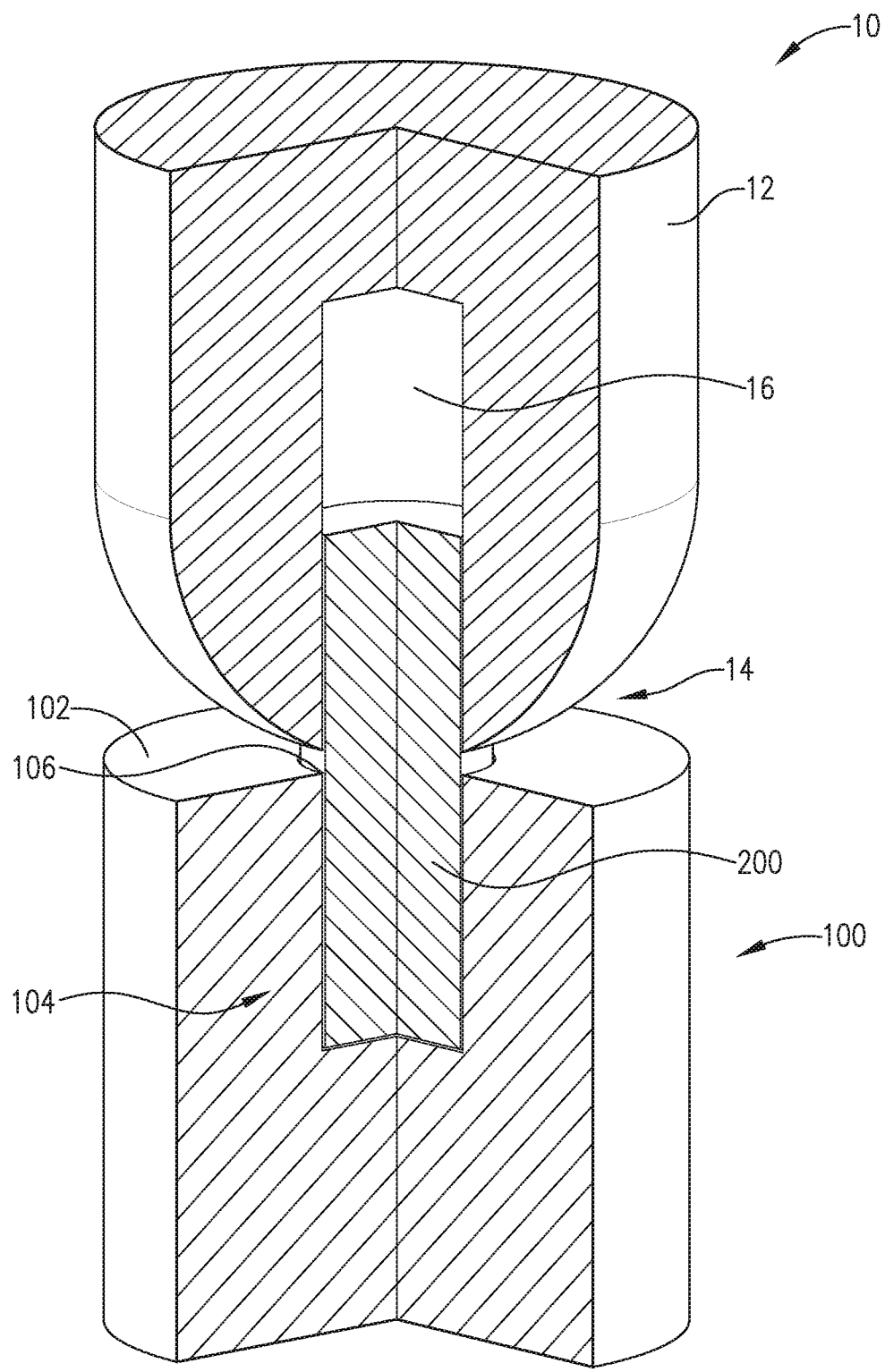
FIG. 1 is a cutaway perspective view in partial section of a swaging punch constructed in accordance with an embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 2:
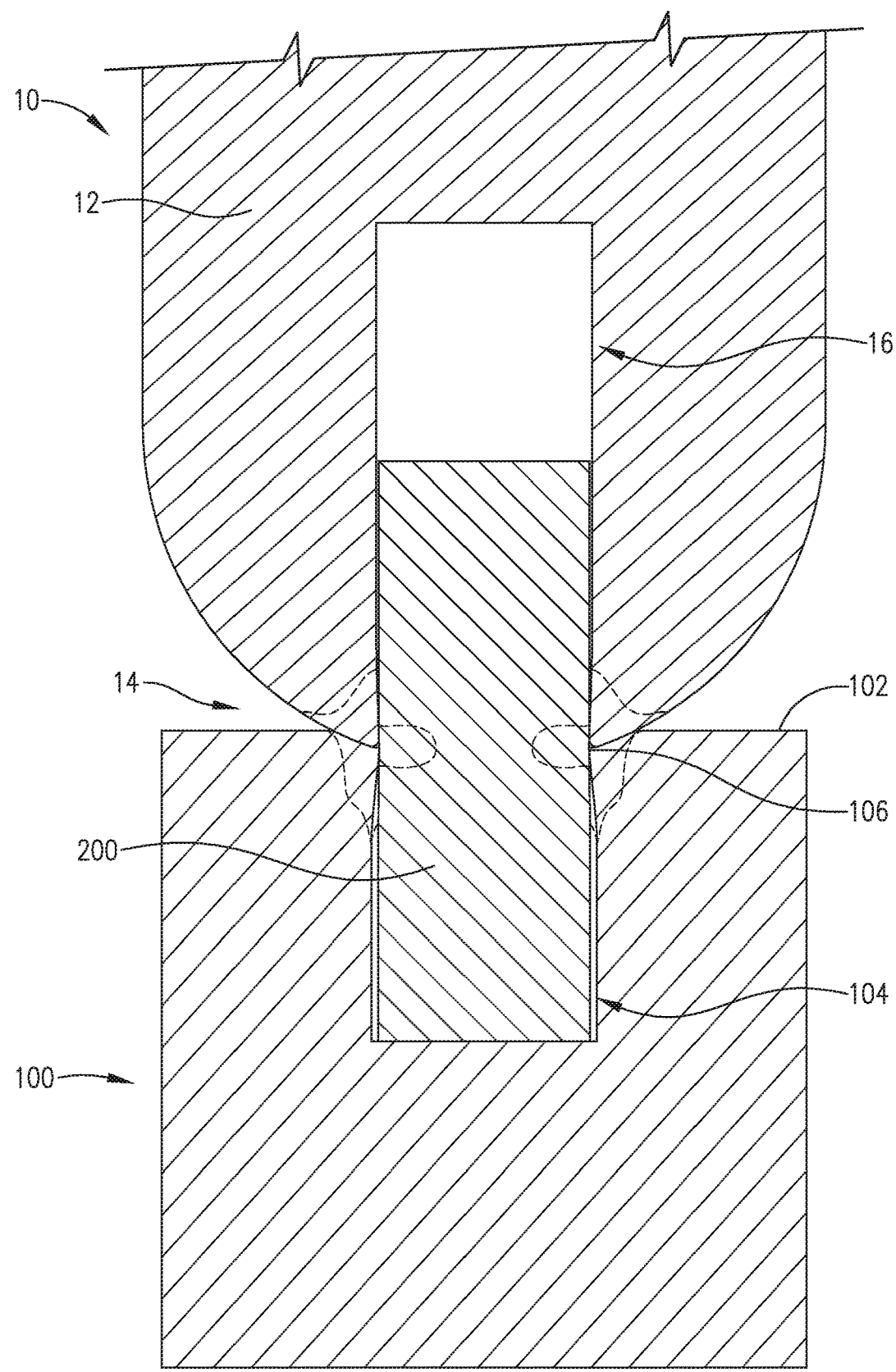
FIG. 2 is a vertical section view of the swaging punch of FIG. 1.

Turning now to the drawing figures, and particularly FIGS. 1 and 2, a self-aligning swaging punch 10 (hereinafter "swaging punch 10") constructed in accordance with an embodiment of the invention is illustrated. The swaging punch 10 may be used for affixing a pin to a workpiece and broadly comprises a shaft 12 and an inwardly-tapered tip 14.

The shaft 12 transfers axial force to the tip 14 and may be substantially cylindrical or radially symmetrical for imparting an even and balanced axial force to the tip 14. The shaft 12 may include a handle or adaptor geometry for inserting the shaft 12 into the chuck of a punching machine, pressing machine, drill press, or any other suitable machine. The shaft 12 may be formed of tool-grade steel or other similar high-strength material.

The inwardly-tapered tip 14 (hereinafter "tip 14") transfers the axial force from the shaft 12 to a workpiece 100 and may include an open-ended cavity 16. The tip 14 may be spherical, frusto-conical, oblong, or any other suitable inwardly-tapered shape. Alternatively, the tip 14 may have an orthogonal cross section for use with square or rectangular pins and pinholes. It will be understood that the tip 14 may be any suitable shape for swaging pins and pinholes of any size and shape. For example, the tip 14 may be a tapered circular, rectangular, square, or hexagonal shape or any other shape. The tip 14 may be an extension or an integral part of the shaft 12 and may be formed of tool-grade steel or other similar high-strength material.

The open-ended cavity 16 receives at least a portion of a pin 200 therein and extends upwardly into the tip 14 and/or shaft 12. The open-ended cavity 16 may be cylindrical (circular cross section) or any other suitable shape for restricting sideways movement of the pin 200 within the open-ended cavity 16. The open-ended cavity 16 may have a diameter that is slightly larger than the diameter of the pin 200 but slightly smaller than the diameter of a pinhole 104 in the workpiece 100. The open-ended cavity 16 may be coaxially aligned with the tip 14 such that the shaft 12 and tip 14 are coaxially aligned with the pin 200 when the pin 200 is positioned in the open-ended cavity 16. The open-ended cavity 16 may be shorter than the pin 200 such that the pin 200 will at least partially extend from the tip 14 when fully inserted into the open-ended cavity 16.

Use of the swaging punch 10 will now be described in more detail. First, the pin 200 may be inserted at least partially inserted into the open-ended cavity 16. The swaging punch 10 may then be positioned near the pinhole 104 of the workpiece 100 such that the pin 200 is at least partially inserted into the pinhole 104. The tip 14 of the swaging punch 10 may also contact the top surface 102 of the workpiece 100 near an upper edge 106 of the pinhole 104. The open-ended cavity 16 will ensure that the swaging punch 10 is aligned with the pin 200 and is perpendicular to the top surface 102 of the workpiece 100. A controlled coaxial force may then be applied to the shaft 12 of the swaging punch 10 such that the tip 14 of the swaging punch 10 presses against the top surface 102 of the workpiece 100 near the edge 106. The tip 14 will deform the material of the workpiece 100 near the edge 106 such that some of the material deflects radially inwardly into the pinhole 104 against the pin 200 so as to create an interference fit between the pin 200 and the workpiece 100 at high stress areas, as shown in FIG. 2. Note the high stress areas within the dashed lines of FIG. 2. The workpiece 100 will thus exert an inward radial force on the pin 200 so as to retain the pin 200 in the pinhole 104 after the swaging punch 10 is removed. The coaxial force may be manually controlled or monitored via a force gauge. The swaging punch 10 may then be pulled away from the workpiece 100 and the pin 200. The swaging punch 10 may then be re-used by inserting another pin 200 in the open-ended cavity 16.

The above-described swaging punch 10 provides several advantages over conventional swaging systems. For example, the shape of the tip 14 ensures that the material deforms evenly into the pinhole 104 around the pin 200. The open-ended cavity 16 perpendicularly aligns the swaging punch 10 and the pin 200 with the outer surface 102 of the workpiece 100. This ensures that the coaxial force is evenly transferred to the outer surface 102 of the workpiece 100 near the edge 106 of the pinhole 104. The open-ended cavity 16 is sized to snugly receive the pin 200 while allowing the swaging punch 10 to be removed when the pin 200 is secured in the pinhole 104. The swaging punch 10 may be reused and does not require the use of power tools or elaborate machine setups. The swaging punch 10 may be designed to meet a variety of radial contact pressures and pullout force requirements and may be used with metallic and polymeric materials and any other relatively malleable material. Use of a force gauge to monitor the axial force will ensure that a desired amount of force is applied to the workpiece 100 and that each swaging process is performed uniformly.

Figure 3:
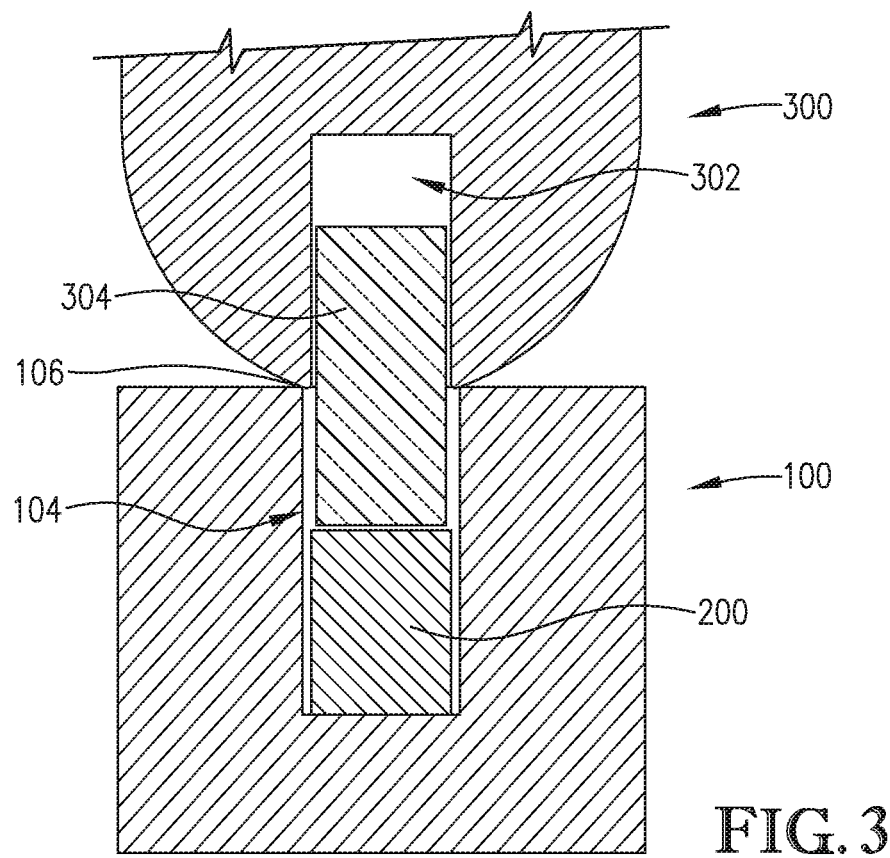
FIG. 3 is a vertical section view of a swaging punch constructed in accordance with another embodiment of the present invention.

A self-aligning swaging punch 300 constructed in accordance with another embodiment of the present invention is similar to the swaging punch 10 described above except that the open-ended cavity is a plug cavity 302 for receiving a sacrificial center-finder plug 304 therein, as shown in FIG. 3. The center-finder plug 304 may be a cylindrical plug or other similar free-moving member configured to shift into and out of the plug cavity 302. For example, the center-finder plug 304 and the plug cavity 302 may have complementary circular, rectangular, square, or hexagonal cross sections or any other shape.

In use, the swaging punch 300 may retain the center-finder plug 304 entirely in the plug cavity 302 such that the tip of the swaging punch 300 may be moved against the outer surface 102 of the workpiece 100 with the center-finder plug 304 being positioned within the plug cavity 302. The center-finder plug 304 may then shift or fall at least partially out of the plug cavity 302 at least partially into the pinhole 104 when the center-finder plug 304 (and the plug cavity 302) are aligned with the pinhole 104. Once the swaging punch 300 is aligned with the pinhole 104, a force may be applied to the swaging punch 300 as described above, such that some of the material of the workpiece 100 near the edge 106 of the pinhole 104 is urged inwards against the center-finder plug 304 and/or the pin 200. That is, the center-finder plug 304 may retain the pin 200 in the pinhole 104 via the interference fit between the center-finder plug 304 and the workpiece 100. Alternatively, the center-finder plug 304 may be small enough to be retrieved from the pinhole 104 while the pin 200 is retained in the pinhole 104 via the inwardly-deformed material of the workpiece 100.

The above-described swaging punch 300 provides several advantages over conventional swaging systems. For example, the center-finder plug 304 ensures that the swaging punch 300 is aligned with the pinhole 104. The center-finder plug 304 allows the pin 200 to be secured in the pinhole 104 without any portion of the pin 200 extending beyond the outer surface 102 of the workpiece 100. In addition, the center-finder plug 304 may be retained in the pinhole 104 such that the pin 200 is not exposed. Preventing the pin 200 from being exposed may be beneficial in a number of swaging applications.

Figure 4:
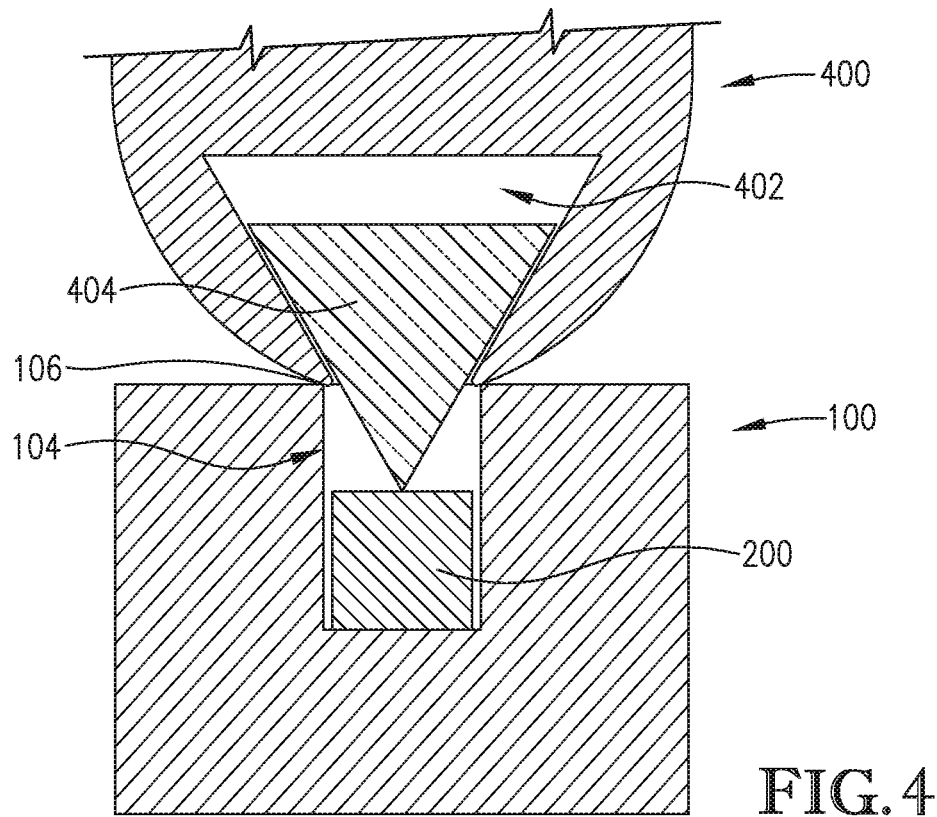
FIG. 4 is a vertical section view of a swaging punch constructed in accordance with yet another embodiment of the present invention.

A self-aligning swaging punch 400 constructed in accordance with yet another embodiment of the present invention is similar to the swaging punch 300 described above except that the swaging punch 400 includes a plug cavity 402 that narrows towards its opening and a center-finder plug 404 that narrows towards its distal end, as shown in FIG. 4. The plug cavity 402 may be frusto-conical or any other similar shape that comprises a larger interior and a narrower or narrowing neck. The center-finder plug 404 may be conical or any other similar shape that has a larger base width or base diameter and a smaller or narrowing distal end. The narrower opening of the plug cavity 402 retains the center-finder 404 at least partially in the plug cavity 402 such that the plug cavity 402 remains in the tip of the swaging punch 400.

In use, the swaging punch 400 may retain the center-finder plug 404 entirely in the plug cavity 402 such that the tip of the swaging punch 400 may be moved against the outer surface 102 of the workpiece 100 with the center-finder plug 404 being positioned within the plug cavity 402. The conical or narrowing shape of the center-finder plug 404 will allow the center-finder plug 404 to gradually extend farther out from the plug cavity 402 when the swaging punch 400 moves into alignment with the pinhole 104. Similarly, the conical or narrowing shape of the center-finder plug 404 allows the edge 106 of the workpiece 100 to gradually urge the center-finder plug 404 into the plug cavity 402 when the swaging punch 400 moves out of alignment with the pinhole 104. The center-finder plug 404 will extend farthest from the plug cavity 402 when the swaging punch 400 is aligned with the pinhole 104, as shown in FIG. 4. A force may then be applied to the swaging punch 400 as described above, such that some of the material of the workpiece 100 near the edge 106 of the pinhole 104 is urged inwards into the pinhole 104. In this embodiment, the center-finder plug is retained in the plug cavity 402 and will not become lodged in the pinhole 104. Meanwhile, the pin 200 is retained in the pinhole 104 via the inwardly-deformed material of the workpiece 100.

The above-described swaging punch 400 provides several advantages over conventional swaging systems. For example, the center-finder plug 404 ensures that the swaging punch 400 is aligned with the pinhole 104 while allowing the swaging punch 400 to be slid along the outer surface 102 of the workpiece 100 into alignment with the pinhole 104. The center-finder plug 404 allows the pin 200 to be secured in the pinhole 104 without any portion of the pin 200 extending beyond the outer surface 102 of the workpiece 100. In addition, the center-finder plug 404 is not retained in the pinhole 104 and instead remains in the tip of the swaging punch 400.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A self-aligning swaging punch for affixing a pin to a workpiece having a pinhole, the self-aligning swaging punch comprising:
 a shaft having a proximal end and a distal end;
 an inwardly-tapered tip extending from the distal end of the shaft and having a contact end and an open-ended cavity extending upwardly from the contact end; and
 a plug positioned in the open-ended cavity, the plug being configured to protrude farther from the open-ended cavity when the open-ended cavity comes closer into alignment with the pinhole and to be displaced upwards into the open-ended cavity when the open-ended cavity deviates from alignment with the pinhole such that the plug protrudes farthest from the open-ended cavity when the open-ended cavity is aligned with the pinhole,
 the contact end of the inwardly-tapered tip being configured to deform an upper edge of the pinhole radially inwardly when the open-ended cavity is aligned with the pinhole, the contact end is positioned near the upper edge of the pinhole, and a coaxial force is applied to the shaft so as to secure the pin at least partially in the pinhole.

2. The self-aligning swaging punch of claim 1, wherein the open-ended cavity has an inverted frusto-conical shape.

3. The self-aligning swaging punch of claim 1, wherein the plug has an inverted conical shape.

4. The self-aligning swaging punch of claim 1, wherein the plug has an outer surface and the inwardly-tapered tip has an inner surface, the outer surface and the inner surface being slanted at a common angle.

5. The self-aligning swaging punch of claim 1, wherein the plug has a distal end that terminates at a point.

6. The self-aligning swaging punch of claim 1, wherein the inwardly-tapered tip is semi-spherical.

7. The self-aligning swaging punch of claim 1, wherein the plug has a proximal end and the end of the open-ended cavity is narrower than the proximal end of the plug so that the open-ended cavity retains the plug at least partially therein.

8. The self-aligning swaging punch of claim 1, wherein the plug is centered with the inwardly-tapered tip when the plug is at its farthest protrusion.

9. The self-aligning swaging punch of claim 1, wherein the plug, the contact end of the inwardly-tapered tip, and the open-ended cavity have radial symmetry.

10. The self-aligning swaging punch of claim 1, wherein the plug is configured to be retained entirely in the open-ended cavity.

11. A self-aligning swaging punch for affixing a pin to a workpiece having a pinhole, the self-aligning swaging punch comprising:
 a shaft having a proximal end, a distal end, and a longitudinal axis;
 an inwardly-tapered tip extending from the distal end of the shaft and having a contact end and an open-ended cavity extending upwardly from the contact end, the contact end forming a ring concentric with and perpendicular to the longitudinal axis of the shaft for contacting the workpiece; and
 a plug positioned in the open-ended cavity, the plug being configured to protrude farther from the open-ended cavity when the open-ended cavity comes closer into alignment with the pinhole and to be displaced upwards into the open-ended cavity when the open-ended cavity deviates from alignment with the pinhole such that the plug protrudes farthest from the open-ended cavity when the open-ended cavity is aligned with the pinhole,
 the contact end of the inwardly-tapered tip being configured to deform an upper edge of the pinhole radially inwardly when the open-ended cavity is aligned with the pinhole, the contact end is positioned near the upper edge of the pinhole, and a coaxial force is applied to the shaft so as to secure the pin at least partially in the pinhole.

12. The self-aligning swaging punch of claim 11, wherein the open-ended cavity has an inverted frusto-conical shape.

13. The self-aligning swaging punch of claim 11, wherein the plug has an inverted conical shape.

14. The self-aligning swaging punch of claim 11, wherein the plug has an outer surface and the inwardly-tapered tip has an inner surface, the outer surface and the inner surface being slanted at a common angle.

15. The self-aligning swaging punch of claim 11, wherein the plug has a distal end that terminates at a point.

16. The self-aligning swaging punch of claim 11, wherein the inwardly-tapered tip is semi-spherical.

17. The self-aligning swaging punch of claim 11, wherein the plug has a proximal end and the end of the open-ended cavity is narrower than the proximal end of the plug so that the open-ended cavity retains the plug at least partially therein.

18. The self-aligning swaging punch of claim 11, wherein the plug is centered with the inwardly-tapered tip when the plug is at its farthest protrusion.

19. The self-aligning swaging punch of claim 11, wherein the plug is configured to be retained entirely in the open-ended cavity.

20. A self-aligning swaging punch for affixing a pin to a workpiece having a pinhole, the self-aligning swaging punch comprising:
 a shaft having a proximal end, a distal end, and a longitudinal axis;
 a semi-spherical inwardly-tapered tip extending from the distal end of the shaft and having a contact end and an open-ended cavity extending upwardly from the contact end and having an inverted frusto-conical shape, the contact end forming a ring concentric with and perpendicular to the longitudinal axis of the shaft for contacting the workpiece; and
 a plug being configured to be retained entirely in the open-ended cavity and having an inverted conical shape, the plug being configured to protrude farther from the open-ended cavity when the open-ended cavity comes closer into alignment with the pinhole and to be displaced upwards into the open-ended cavity when the open-ended cavity deviates from alignment with the pinhole such that the plug protrudes farthest from the open-ended cavity when the open-ended cavity is aligned with the pinhole, the shaft, the inwardly-tapered tip, and the plug having radial symmetry;
 the contact end of the inwardly-tapered tip being configured to deform an upper edge of the pinhole radially inwardly when the open-ended cavity is aligned with the pinhole, the contact end is positioned near the upper edge of the pinhole, and a coaxial force is applied to the shaft so as to secure the pin at least partially in the pinhole.

* * * * *